United States Patent
Berner et al.

(10) Patent No.: US 11,316,175 B2
(45) Date of Patent: Apr. 26, 2022

(54) GAS DISTRIBUTOR PLATE FOR GAS DISTRIBUTION AND FLOW GUIDANCE IN ELECTROLYSERS AND FUEL CELLS

(71) Applicant: Robert Bosch GmbH, Stuttgart (DE)

(72) Inventors: Ulrich Berner, Stuttgart (DE); Stefan Schoenbauer, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 62 days.

(21) Appl. No.: 16/759,805

(22) PCT Filed: Oct. 24, 2018

(86) PCT No.: PCT/EP2018/079109
§ 371 (c)(1),
(2) Date: Apr. 28, 2020

(87) PCT Pub. No.: WO2019/086303
PCT Pub. Date: May 9, 2019

(65) Prior Publication Data
US 2020/0343564 A1    Oct. 29, 2020

(30) Foreign Application Priority Data
Oct. 30, 2017    (DE) .................... 10 2017 219 418.9

(51) Int. Cl.
*H01M 8/026*    (2016.01)
*C25B 15/08*    (2006.01)
*H01M 8/0206*    (2016.01)
*H01M 8/0247*    (2016.01)

(52) U.S. Cl.
CPC ............. *H01M 8/026* (2013.01); *C25B 15/08* (2013.01); *H01M 8/0206* (2013.01); *H01M 8/0247* (2013.01)

(58) Field of Classification Search
None
See application file for complete search history.

(56) References Cited

U.S. PATENT DOCUMENTS

| 6,663,997 B2 | 12/2003 | Dong et al. | |
| 2007/0020505 A1* | 1/2007 | Grafl | H01M 8/026 429/434 |
| 2009/0098432 A1* | 4/2009 | Rosenberg | H01M 8/0206 429/444 |

(Continued)

FOREIGN PATENT DOCUMENTS

| CN | 1449066 A | 10/2003 |
| DE | 2040611 C2 | 2/1972 |

(Continued)

OTHER PUBLICATIONS

International Search Report for Application No. PCT/EP2018/079109 dated Feb. 11, 2019 (English Translation, 2 pages).

*Primary Examiner* — Alix E Eggerding
(74) *Attorney, Agent, or Firm* — Michael Best & Friedrich LLP

(57) ABSTRACT

The invention relates to a gas distributor plate (2) for gas distribution and flow guidance at least in electrolysers or fuel cells, comprising a structure arranged on a contact surface of the gas distributor plate (2), for gas distribution and flow guidance, the structure for gas distribution and flow guidance being formed as a deformable structure (10).

26 Claims, 7 Drawing Sheets

(56) References Cited

U.S. PATENT DOCUMENTS

| | | | |
|---|---|---|---|
| 2011/0244369 A1 | 10/2011 | Kondo | |
| 2012/0055223 A1 | 3/2012 | Watanabe et al. | |
| 2015/0311540 A1* | 10/2015 | Jones | B31F 1/07 264/154 |
| 2018/0154416 A1* | 6/2018 | Hirata | H01M 8/025 |
| 2018/0159164 A1* | 6/2018 | Jilani | H01M 8/0267 |

FOREIGN PATENT DOCUMENTS

| | | |
|---|---|---|
| DE | 102016004850 A1 | 10/2017 |
| EP | 2355204 A1 | 10/2012 |
| EP | 1972023 B1 | 6/2013 |
| EP | 2990132 | 3/2016 |
| JP | H11144753 A | 5/1999 |
| JP | 2005100813 A | 4/2005 |
| JP | 2009021022 A | 1/2009 |
| JP | 2010061994 | 3/2010 |
| JP | 2012038569 A | 2/2012 |
| JP | 2012248460 A | 12/2012 |
| JP | 5252193 | 7/2013 |
| JP | 2015072756 A | 4/2015 |
| JP | 2016146313 A | 8/2016 |
| KR | 20170003668 | 1/2017 |
| WO | 2009144871 A1 | 12/2009 |
| WO | 2013161130 A1 | 10/2013 |
| WO | 2017056759 | 4/2017 |

\* cited by examiner

GAS DISTRIBUTOR PLATE FOR GAS DISTRIBUTION AND FLOW GUIDANCE IN ELECTROLYSERS AND FUEL CELLS

BACKGROUND OF THE INVENTION

The present invention proceeds from a gas distributor plate for gas distribution and flow guidance at least in electrolysers or fuel cells, the gas distributor plate comprising a gas distribution and flow guidance structure arranged on a contact surface of the gas distributor plate. The invention also proceeds from a method for producing the gas distributor plate and a fuel cell comprising a bipolar plate, a membrane electrode assembly and the gas distributor plate.

Gas distributor plates for gas distribution and flow guidance in electrolysers and fuel cells are known from the prior art. Here, as a rule, in a fuel cell or an electrolyser, a gas distributor plate is arranged both on the anode side and on the cathode side. The two plates are separated from one another by a membrane electrode assembly (MEA) comprising a membrane, the electrodes and preferably two gas diffusion layers, and conductively connected to the MEA. In order to ensure an optimum exchange of gas with the membrane electrode assembly, variously formed duct structures, which serve to carry the gases or liquids past the surface of the MEA and to conduct the electrical current from the gas distributor plate to the membrane electrode assembly, are preferably arranged on a surface of each of the gas distributor plates facing the MEA.

JP 5 252 193 B2 and JP 2010-061 994 A each provide for a fine mesh as gas distribution structure in order to improve the gas distribution and flow guidance.

SUMMARY OF THE INVENTION

Features and details described in the context of the gas distributor plate according to the invention obviously also apply in the context of the method according to the invention for producing the gas distributor plate, and of the fuel cell according to the invention, and vice-versa in either case, so that reciprocal reference is or may always be made with regard to the disclosure of the various aspects of the invention.

The gas distributor plate according to the invention serves, in particular, to improve the gas distribution and flow guidance in fuel cells or electrolysers. Here the particular advantage of the gas distributor plate is that it ensures a well-definable and optimized gas distribution on the surface of the MEA. In order to provide the most constant flow of electrical energy possible, and in as far as possible to afford an optimized utilization of the capacity of a fuel cell or electrolyser, it is particularly advantageous to ensure a gas distribution which is as homogeneous as possible. In doing this the gas distributor plate according to the invention is able to reduce or eliminate disturbance variables, such as accumulations of product water produced on the cathode side of a fuel cell, for example, which prevents a homogeneous gas distribution over the entire surface of the MEA. A further advantage of the gas distributor plate according to the invention relates to the especially simple and cost-effective method of production. The gas distributor plate according to the invention furthermore allows easy integration of the plate into known fuel cells or electrolysers, so that the gas distributor plate can also be retrofitted to already existing systems.

The gas distributor plate is preferably a fuel cell gas distributor plate or electrolyser gas distributor plate, in particular a PEM fuel cell gas distributor plate or a PEM electrolyser gas distributor plate. According to the invention the gas distributor plate comprises a gas distribution structure arranged on the contact surface of the plate. Here the gas distributor plate may be of single-part or multipart, in particular two-part formation. A gas distributor plate of single-part formation here has the advantage, in particular, of rapid and easy production, in which the gas distribution structure arranged on the gas distributor plate can be produced in a few production steps, preferably in just one single production step. A gas distributor plate of multipart formation on the other hand allows a flexible production, in which the various parts of the gas distributor plate can be individually matched to the desired characteristics. Thus the gas distributor plate may be of two-part formation for example, in which a first part may be formed as a connecting part preferably of substantially flat formation, which is connected to a second contact part comprising the gas distribution structure by form-fitting or preferably force-fitting and in particular by a material bond. The connection here may be detachable or also permanent. As a form-fitted connection the first and the second part of the gas distributor plate, for example, may be connected together by a tongue-and-groove connection, a dovetail connection or a toothed coupling. A force-fitted connection, on the other hand, may be of wedged or jammed, in particular screwed formation. In the case of a material-bond connection the first and the second part of the gas distributor plate may furthermore be connected together by an adhesively bonded connection, preferably by a soldered connection, in particular by a welded or sintered connection. An individual adaptation of the individual parts of the gas distributor plate may moreover also be done having regard to the choice of material for the individual parts, so that a gas distributor plate of multipart formation can at least in part be assembled from different materials according to the desired characteristics. Here, it is in particular feasible for a gas distributor plate of multipart formation to be assembled from various metallic materials and/or coated non-metallic materials. Furthermore, according to the invention the gas distribution structure of the gas distributor plate is formed as a deformable structure. For the purposes of the invention a deformable structure is here taken to mean a structure which in production engineering terms is brought about through a purely plastic material deformation without losing the material cohesion or changing the mass of the workpiece. Here, distinguishing features of a deformable structure according to the invention are not only a maximum utilization of the material in the production process and thereby especially cost-effective manufacture, but also a short production time. In addition, a distinguishing feature of the actual deformable structure is the high workpiece quality, in particular the increased strength. According to the invention various processing temperatures can be used in the deformation, so that the gas distribution structure formed as a deformable structure may be formed as a hot-formed, preferably semi-hot-formed, in particular cold-formed deformable structure. A cold-formed deformable structure here has the particular advantage of increased strength compared to other deformable structures. Sheet-formed deformable structures or solid-formed deformable structures may furthermore be provided as deformable structures. In addition, various forming methods may be envisaged for the deformation, so that the deformable structure can preferably be formed as a drawn and/or as a compression-formed and/or as a stretch/squeeze-formed and/or as a bend-formed and/or as a shear-formed deformable structure. As a drawn deformable structure, the deformable structure may be stretched or expanded, for example, preferably recessed, a recessed deformable structure in particular being punched or stamped. The stamping method is suitable as a method of manufacture for the actual gas distribution structure particularly owing to its advantages of rapid, cost-effective and precise production, in which various stamping processes are feasible, so that the gas distribution structure may be produced by vertical or roll-on stamping. A compression-formed deformable structure may furthermore be formed in particular as a rolled and/or flat die-formed and/or open die-formed and/or impressed and/or extruded deformable structure. A stretch/squeeze-formed deformable structure may furthermore be formed as a drawn and/or deep-drawn and/or pressed deformable structure.

In the context of the invention the gas distributor plate may advantageously have a material thickness of at least less than 150 μm, preferably of less than 100 μm, more preferably of less than 75 μm, the gas distributor plate in particular possessing an homogeneous deformable structure having a substantially constant deformation depth. As a basis for dimensioning of the layer thickness a gas distributor plate of single-part formation is objectively assumed here. In the case of a gas distributor plate of two-part formation, both parts of the plate may have the same layer thickness or also a different layer thickness. By analogy, in the case of a gas distributor plate of two-part formation it is therefore objectively proposed that both parts of the plate have a material thickness of at least less than 150 μm, preferably of less than 100 μm, more preferably of less than 75 μm. The small dimension of the layer thickness according to the invention is advantageous particularly in the production of the gas distribution structure, since smaller compressive and/or tensile forces thereby have to be used in order to form the gas distribution structure. This saves not only the material used for the gas distribution structure but also in particular the material for the tooling and machinery used for the forming. Moreover, a gas distributor plate having a layer thickness of small dimensions has weight advantages over plates with larger calibers. Nevertheless, according to the invention the layer thickness is dimensioned so that no disadvantages occur with regard to the stability of the plate. A homogeneous deformable structure having a substantially constant deformation depth meanwhile affords a largely homogeneous gas and charge distribution along the gas distribution structure with largely constant pressure ratios, which is necessary for provision of the most constant possible flow of electrical energy and for an as far as possible optimized utilization of the energy. A deformable structure having a substantially constant deformation depth is regarded, for the purposes of the invention, as a deformable structure having a deviation in the deformation depth of less than 5%, preferably of less than 3%, more preferably of less than 1%. The undeformed upper surface and the deformed lower surface of an actual gas distributor plate here in particular serve as a basis for the dimensioning of the deformation depth. Here, in the context of this invention, the deformation depth of a deformable structure is taken to mean the distance, running in the main deformation direction perpendicular to the upper surface, between the upper side of the undeformed upper surface and the underside of the deformed lower surface of the gas distributor plate, in particular the underside of the furthest deformed point of the corresponding deformable structure. It goes without saying that in a gas distributor plate of multipart formation comprising a first connecting part and a second contact part only the spacing distances of the second contact part comprising the gas distribution structure are used as a basis for dimensioning. It is proposed according to the invention that the individual deformable structures have a maximum deformation depth of less then 1 mm, preferably of less than 700 μm, more preferably of less than 350 μm. A corresponding deformation depth is on the one hand easy to produce in production engineering terms, and on the other, for a given geometry of the deformable structures, is of sufficient dimensions to ensure an efficient flow guidance of corresponding gases and liquids. Although larger deformation depths would be readily feasible from a production engineering standpoint, they would be disadvantageous in regard to the associated extent of the corresponding cells, it being necessary to bear in mind that in so-called fuel cell stacks multiple gas distributor plates are arranged in rows side by side.

Particular technical demands are placed on the materials of gas distributor plates of fuel cells and electrolysers. For example, the plates must not only possess a high electrical and thermal conductivity, but must also be robust in response to chemical influences in the cell and also capable of withstanding the high mechanical contact pressures in the cell. Furthermore, it is necessary, particularly for use in high-temperature fuel cells and high-temperature electrolysers, for the plate materials to withstand high temperatures sometimes far in excess of 200° C. For these reasons it is proposed that the gas distributor plate according to the invention be formed, at least in part, from a metallic material, preferably at least in part from a ferrous material (such as special steel, for example), more preferably at least in part from a titanium material. Alternatively or in addition, the gas distributor plate according to the invention may be formed at least in part from steel and/or an aluminum material and/or a copper material and/or a non-ferrous metal material, in particular a plastic, a carbonaceous material, for example graphite-like material, or a ceramic. In order to ensure the necessary electrical conductivity in the case of an embodiment having a gas distributor plate formed from a non-ferrous metal material, a non-ferrous metal material may be provided with a corresponding electrically conductive coating. In an embodiment of two-part formation, moreover, different materials may also be combined with one another, allowing an especially flexible adaptation of the gas distributor plate to the particular desired characteristics of the plate. For example, a first part of the gas distributor plate formed as connecting part may be formed at least in part from a copper material, whilst a second part of the gas distributor plate formed as contact part may be formed at least in part from an aluminum material. Thus, the contact part, in particular, comprising the gas distribution structure and preferably occupying a greater volume, may be of lightweight design construction, whilst nevertheless ensuring a high electrical conductivity of both parts. In order to prevent forms of contact corrosion, which are prevalent on the boundary faces of surfaces formed from different metallic materials, a part of the gas distributor plate may additionally be provided with an appropriate coating. Thus in the case of a two-part embodiment a first part of the gas distributor plate formed as connecting part may be formed, for example, from a copper material, whilst a second part intended as contact part and provided with a gas distribution structure may be formed from an aluminum material, it being correspondingly possible to provide the latter with a coating of a copper material in order to prevent contact corrosion. As an alternative to a correspondingly coated contact part of an aluminum material, the part comprising the gas distribution structure may also be formed, at least in part, from a non-ferrous metal material, which for electrical conductivity may be coated with a suitable metallic material.

According to the invention, furthermore, the deformable structure of the gas distributor plate is formed in such a way that gas distribution ducts are formed along the deformable structure, the width of the gas distribution ducts and/or of the individual deformable structures being less than 1 mm, preferably less than 500 µm, and the individual deformable structures and/or the gas distribution ducts being arranged in rows arranged substantially parallel and/or perpendicular to one another. The ducts arranged along the deformable structures of the gas distribution structure physically form the areas along which the gas is led along the gas distribution structure. The dimensioning of the ducts is here determined by the arrangement and the extent of the deformable structures. In the context of the invention the duct width is measured over the distance between two directly adjacent deformable structures. In the case of a gas distributor plate having deformable structures of substantially equal deformation depth, the duct width here is calculated from half the deformation depth of each of the directly adjacent deformable structures. This is important particularly when the distance between two adjacent deformable structures is not constant along the deformation, as is the case, for example, with pyramidal or conically formed deformable structures. In the context of this invention an arrangement of the gas distribution ducts is regarded as being parallel and/or perpendicular if the ducts run with an offset of less than 5% of the mean width, preferably of less than 2.5% of the mean width, more preferably of less than 1% of the mean duct width. A substantially parallel and/or perpendicular arrangement of the gas distribution ducts within the gas distribution structure on the gas distributor plate having a substantially constant duct length and width affords substantially constant gas pressures over the entire gas distribution structure. This guarantees not only the provision of constant electrical energy but also the most efficient utilization possible of the active surface of the MEA.

In an alternative to a gas distribution structure with a homogeneous deformable structure, according to the invention the gas distributor plate may have an at least partially inhomogeneous deformable structure comprising individual, asymmetrically formed deformable structures, the deformable structures preferably being asymmetrically recessed along their shape, and the edge of these deformable structures arranged towards the incident-flow side, in particular, being chamfered or curved. Such a structure is particularly suited to preventing accumulations of product water produced on the cathode side of a fuel cell, which prevents an homogeneous gas distribution over the entire surface of the MEA. This is achieved in that the, at least in part, smaller deformation depth purposely formed on the incident-flow side creates a greater distance of the gas distribution structure from the membrane electrode assembly, thereby here purposely leading the flow under the surface contact.

In order to allow an optimized and purposeful flow guidance along the actual gas distribution structure, according to the invention variously formed deformable structures may be provided. Thus, the deformable structures, for example, may be of block-shaped and/or cuboidal and/or pyramidal and/or conical and/or cylindrical shape. A gas distributor plate according to the invention in this case may comprise both a homogeneous gas distribution structure exclusively comprising deformable structures of the same shape and an inhomogeneous gas distribution structure, in which variously shaped deformable structures are arranged on one and the same gas distributor plate. The deformable structures may preferably be of chamfered or curved formation, particularly on the incident-flow side of the gas distributor plate, and at the same time formed in such a way that they have a minimal angle of incidence α, preferably an angle of incidence α of less than 90°, more preferably of less than 60°, in particular of less than 45°. Here, in the context of the invention, an angle of incidence α is taken to mean the angle between the plane running through the undeformed upper surface of the deformable structure and the laterally arranged inner surface of the deformable structure. A smaller angle of incidence of the deformable structures arranged on the incident-flow side improves the flow guidance of the gas distributor plate by purposely leading the flow under the surface contact.

Furthermore, to improve the flow device, slatted or finned flow baffle devices, which purposely serve to lead the gases or liquids under the surface contact, may alternatively or additionally be arranged in particular on the incident-flow side of the gas distribution structure. The introduction of this flow baffle device of slatted or finned formation may either be incorporated into the relevant forming step or be done in a separate forming step. The flow baffle device of slatted or finned formation is thereby formed solidly with the gas distribution structure by a material bond or shaped out of the latter.

To further improve the flow guidance and the gas distribution, it is further proposed that besides a substantially parallel or perpendicular arrangement the deformable structures be arranged offset in relation to one another and/or with the shape alternating in different directions and/or basically arranged randomly in relation to one another. Alternatively or in addition to these arrangements, the deformable structures may moreover comprise a first and a second deformation area, a first area, in particular, arranged on the lower surface of the deformable structure, being of tapered formation. This makes it possible to increase the duct width, particularly in the area of the boundary face of the gas distributor plate with the MEA. Thus, according to the invention preferably stepped deformable structures can be provided, which comprise deformed areas tapering particularly in the direction of deformation.

The invention likewise relates to a method having the features of the independent method claim. Here it is objectively proposed that the gas distribution and flow guidance structure arranged on a contact surface of the gas distributor plate be produced by a forming method. The method according to the invention thereby affords the same advantages as have been described in detail with regard to the gas distributor plate according to the invention. As has already been stated in the explanations on the gas distributor plate according to the invention, hot-forming processes, preferably semi-hot-forming processes, and in particular cold-forming processes may be used as forming methods for the production of the gas distributor plate according to the invention, in which the forming methods may be embodied as a sheet-forming methods or solid forming methods. In particular drawing methods and/or compression-forming methods and/or stretch/squeeze-forming methods and/or bend-forming methods and/or shear-forming methods may be employed, with particular scope in the context of a drawing method for forming the deformable structure by stretching, expanding, or recessing, and in the context of recessing for forming the gas distribution structure by punching or stamping, in particular. As already explained, a stamping process is suitable as a method of production for the actual gas distribution structure particularly owing to its advantages of rapid, cost-effective and precise production, in which various stamping processes are feasible, such as vertical or roll-on stamping. In the context of a deformable structure formed by compression-forming furthermore, a rolling and/or flat die-forming method and/or impressing method and/or extrusion method in particular may be used. In the context of stretch/squeeze forming the actual deformable structure may be formed, in particular, by a drawing method and/or deep-drawing method and/or pressing method.

The invention likewise relates to a fuel cell comprising a bipolar plate, a membrane electrode assembly and a gas distributor plate according to the invention. Here it is objectively proposed that the gas distributor plate be arranged between the bipolar plate and the membrane electrode assembly and conductively connected to the bipolar plate and the membrane electrode assembly, the gas distributor plate preferably being connected to the bipolar plate by a material bond. The material bond connection here may be adhesively bonded, preferably soldered, in particular welded or sintered.

BRIEF DESCRIPTION OF THE DRAWINGS

Further advantages, features and details of the invention emerge from the following description, in which exemplary embodiments of the invention are described in detail referring to the drawings. Here the features mentioned in the claims and in the description may each be essential for the invention either individually or in any combination.

In the drawings.

In the figures identical reference numerals are used for the same technical features.

DETAILED DESCRIPTION

Figure 1:
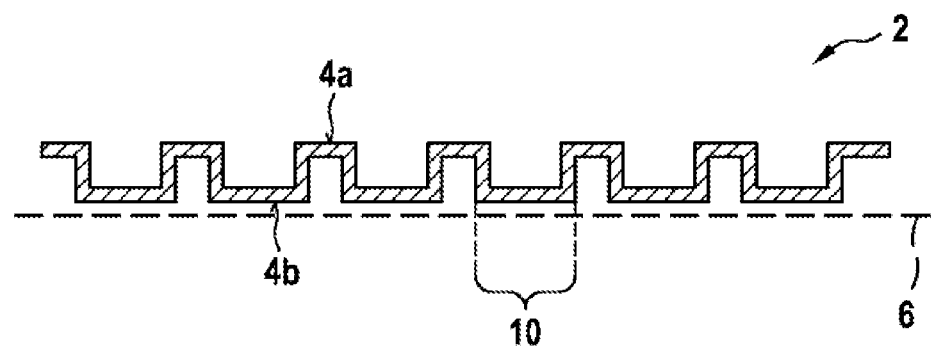
FIG. 1 in a sectional view shows a schematic representation of a first exemplary embodiment of a gas distributor plate according to the invention.

FIG. 1 in a sectional view shows a schematic representation of a first exemplary embodiment of a gas distributor plate 2 according to the invention. The gas distributor plate 2 has an upper surface 4a arranged along an undeformed area and a lower surface 4b arranged along a deformed area. By way of the lower surface 4b the gas distributor plate 2 is set directly against the gas diffusion layer of a membrane electrode assembly 6 and electrically is conductively connected to the latter. The gas distributor plate 2 comprises a gas distribution structure formed as a deformable structure, which is formed from multiple individual deformable structures 10.

Figure 2:
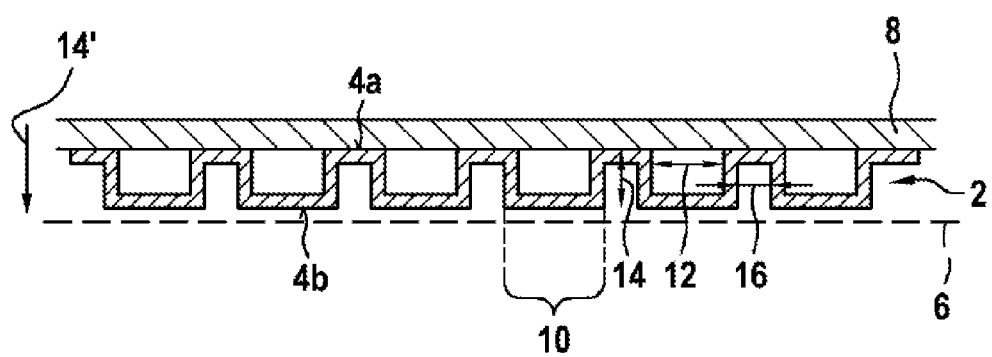
FIG. 2 shows a gas distributor plate according to the invention as in FIG. 1 arranged on a bipolar plate, FIG. 3 in a sectional view shows a schematic representation of a second exemplary embodiment of a gas distributor plate according to the invention.

FIG. 2 shows the gas distributor plate 2 according to the invention in FIG. 1 arranged on a bipolar plate 8. The two plates 2, 8 are firmly connected together, preferably force-fitted together, in particular connected by a material bond, the bipolar plate 8 being directly connected to the gas distributor plate 2 by the undeformed upper surface 4a. The gas distributor plate 2 according to FIG. 2 has a homogeneous, block-shaped gas distribution structure, in which the individual deformable structures 10 have a substantially constant deformation depth 14 and a constant distribution along the gas distributor plate 2. An individual deformable structure 10 here has a deformation width 12, which represents the inside diameter of the respective deformable structure and is measured along half the deformation depth of the deformable structure 10. This definition is to be observed particularly in the case of deformable structures 10 having a cross section that varies along the deformation depth 14 in the main deformation direction 14'. The deformation depth 14 of a deformable structure 10 meanwhile is measured as the distance, running along the main deformation direction perpendicular to the upper surface 4a, between the upper side of the undeformed upper surface 4a and the underside of the deformed lower surface of the gas distributor plate 2, in particular the underside of the furthest deformed point of the corresponding deformable structure 10. Besides the deformation depth 10 and the width of a deformable structure 12, the gas distribution structure is further characterized by the distances between deformable structures 16 arranged directly adjacent to one another, this distance likewise being measured at half the deformation depth of the corresponding deformable structures 10. The intervals between the individual deformable structures 10 ultimately define the gas distribution ducts 24, along which the gases and the liquids are led past between the gas distributor plate 2 and the membrane electrode assembly 6.

Figure 3:
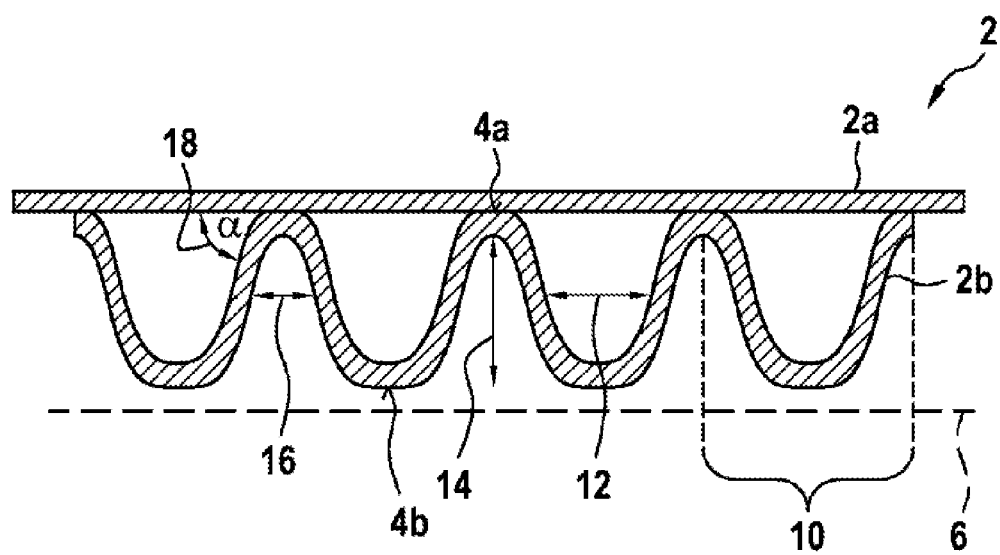
Figure 4A:
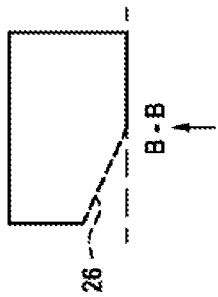
FIGS. 4a-4c show schematic representations of three different exemplary embodiments of deformable structures of a gas distributor plate according to the invention, each in top view and in sectional views along the sections A-A and B-B, FIGS. 5a-5d in sectional views show schematic representations of differently shaped deformable structures according to the invention, FIGS. 6a and 6b in sectional views show schematic representations of three differently shaped deformable structures according to the invention with deformed depressions arranged inside the deformable structure.
Figure 4A:
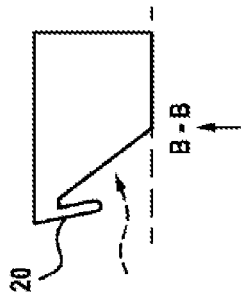
Figure 4A:
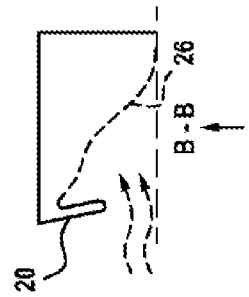
Figure 4A:
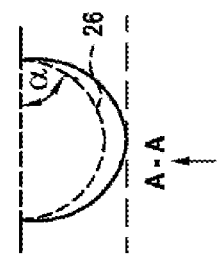
Figure 4A:
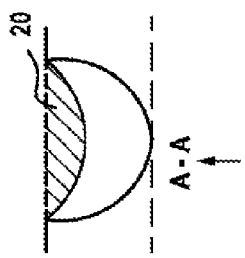
Figure 4A:
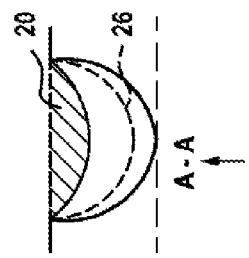
Figure 4A:
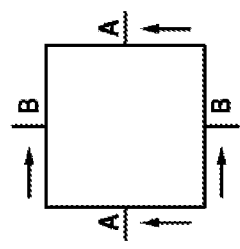
Figure 4B:
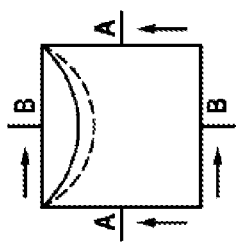
Figure 4C:
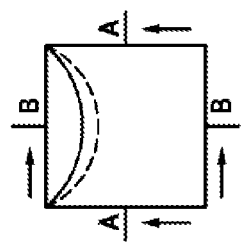

FIG. 3 in a sectional view shows a schematic representation of a second exemplary embodiment of a gas distributor plate 2 according to the invention. In contrast to the gas distributor plate 2 represented in FIGS. 1 and 2, the plate here is a gas distributor plate 2 of two-part formation which is assembled from a first connecting part 2a and a second contact part 2b. A gas distributor plate 2 formed in this way in particular affords an easy and cost-effective integration into fuel cells or electrolysers. As can be seen from FIG. 3, the first part 2a formed as connecting part is not taken into account in determining the deformation depth 14. The contact part 2b here comprises the gas distribution structure formed as a deformable structure and makes the electrical contact to the membrane electrode assembly 6. The gas distribution structure according to FIG. 3, also, is formed as a homogeneous gas distribution structure in respect of the deformation depth 14, the deformation width 12 of the individual deformable structures 10 and the distance between the deformable structures 16. However, the individual deformable structures 10 here are not block-shaped but of a truncated-cone shape, the angle between the conical surface and the base of the cone being defined by the angle of incidence α. In general, in the context of the invention the angle of incidence α is taken to mean the angle between the plane running through the upper surface of the deformable structure 10 and the laterally arranged inner surface of a deformable structure. An acute angle of incidence α allows a better flow guidance, particularly in the area of the incident-flow side, in that the flow here can be purposely led under the surface contact FIGS. 4a-c show schematic representations of three different exemplary embodiments of deformable structures 10 of a gas distributor plate 2 according to the invention, each in a top view (left) and in sectional views along the sections A-A (center) and B-B (right) of a section along the direction of flow. FIG. 4a shows a deformable structure 10 having a slightly chamfered deformable structure 10 on the incident-flow side to improve the flow guidance. The chamfering 26 allows the flow to be purposely led under the surface contact, so that the accumulation of product water can be effectively countered. FIG. 4b shows a deformable structure 10 of a gas distributor plate 2 in which a slatted or finned flow baffle device 20, which likewise serves to lead the flow efficiently under the surface contact, is arranged to improve the flow guidance. The flow baffle device 20 here is a part shaped out of the gas distributor plate 2 but may also be formed as a separate part. FIG. 4c finally shows a deformable structure 10 of a gas distributor plate 2 in which in addition to a chamfer 26 arranged on the incident-flow side a slatted or finned flow baffle device 20 is arranged in order to improve the flow guidance.

FIGS. 5a-d in sectional views show schematic representations of differently shaped deformable structures 10 according to the invention. The external shape of the deformable structures 10 makes it possible to purposely influence the gas distribution and flow guidance along the gas distribution structure.

Figure 5A:
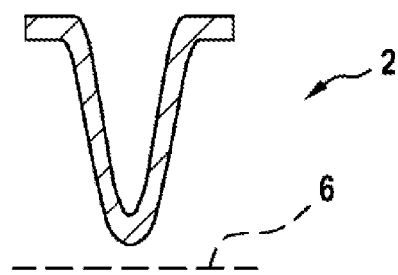
Figure 5B:
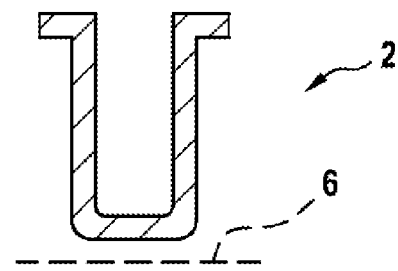
Figure 5C:
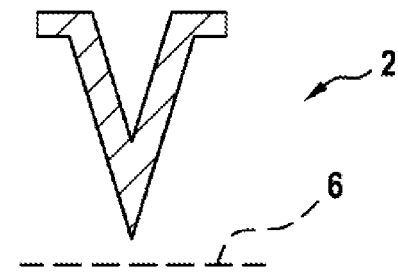
Figure 5D:
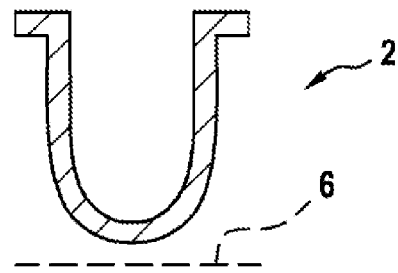

FIGS. 5a and 5d here show a V or U-shaped form of highly rounded cross section, whereas FIGS. 5b and 5c show V or U-shaped forms of sharply angular cross section. A gas distributor plate 2 according to the invention may here have both a homogeneous gas distribution structure comprising deformable structures 10 of the same shape, and also an inhomogeneous gas distribution structure comprising deformable structures 10 of various shapes.

Figure 6A:
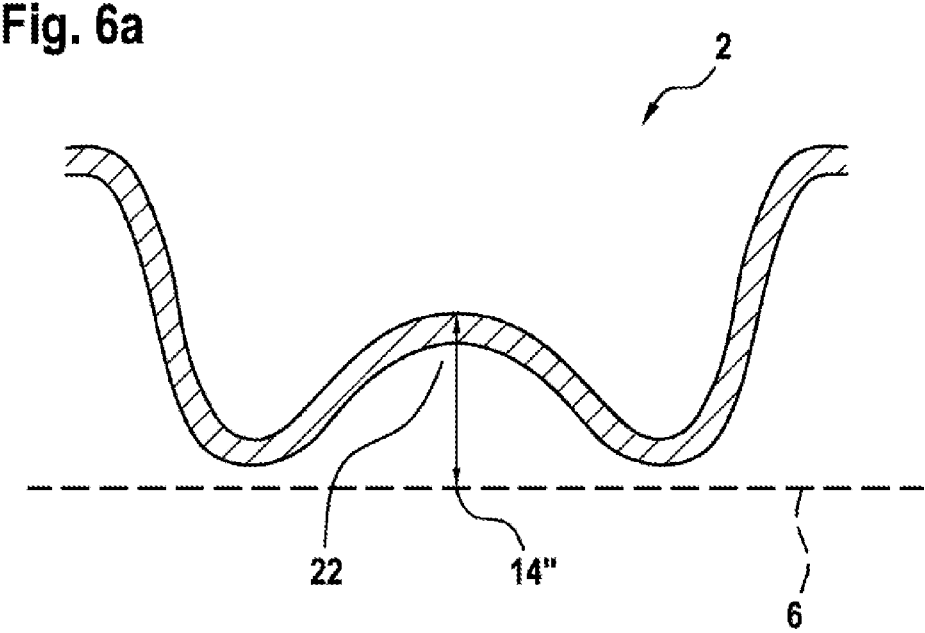
Figure 6B:
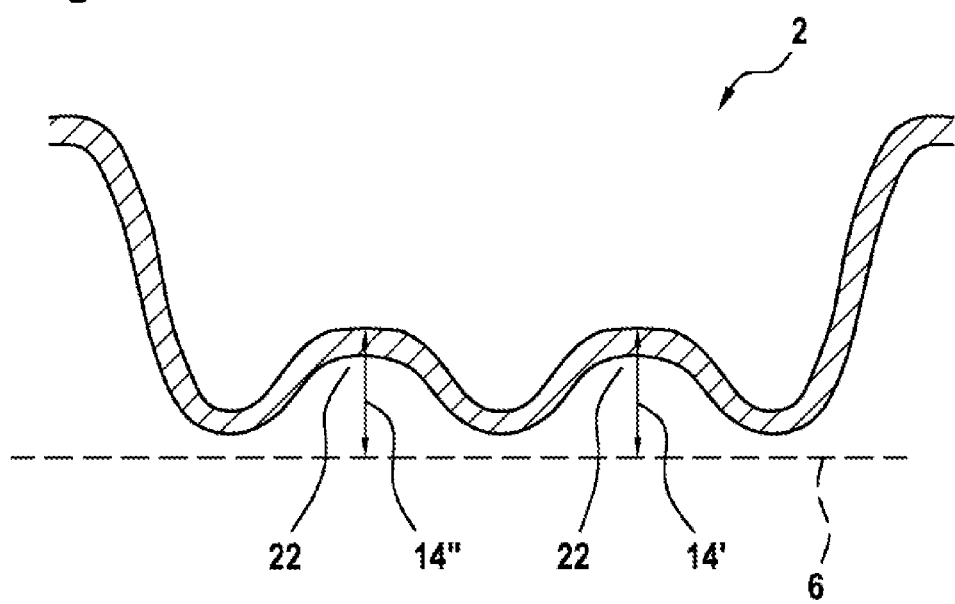

FIGS. 6a, b in sectional views show schematic representations of three differently shaped deformable structures 10 according to the invention with deformed depressions 14' arranged inside the deformable structures 10. FIG. 6a here shows a deformed depression 14" arranged inside the deformable structure 10; FIG. 6b on the other hand shows two deformed depressions 14" arranged inside the deformable structure 10, along which gases or liquids can be led past the gas distributor plate 2.

Figure 7A:
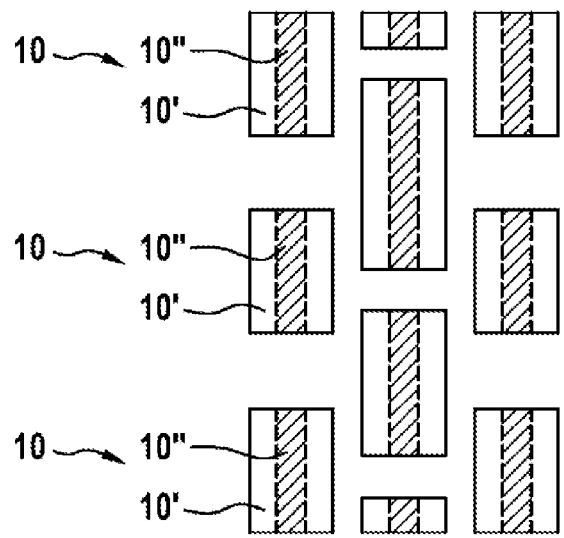
FIGS. 7a-7d in top views show schematic representations of partial areas of various gas distribution structures according to the invention.
Figure 7B:
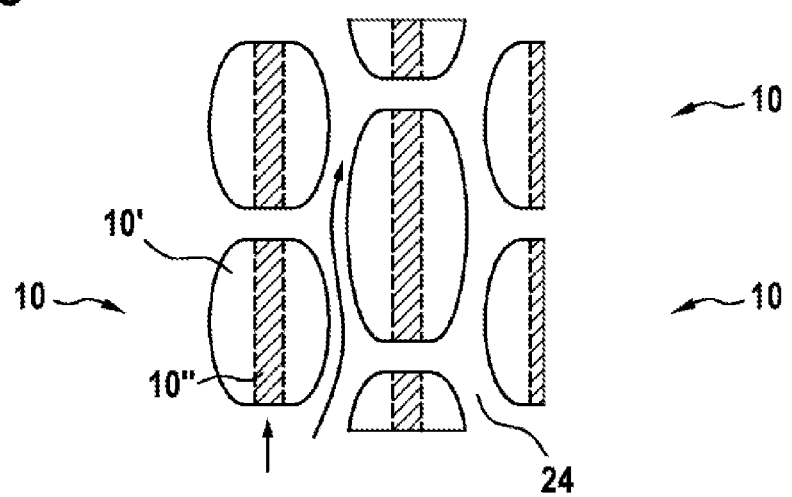
Figure 7C:
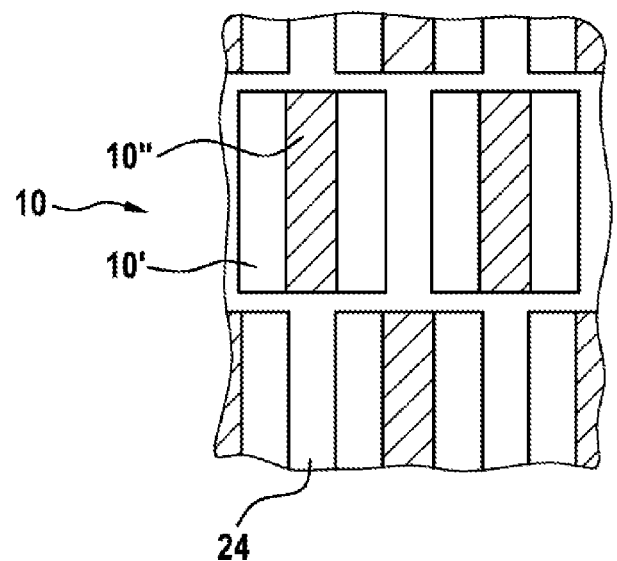
Figure 7D:
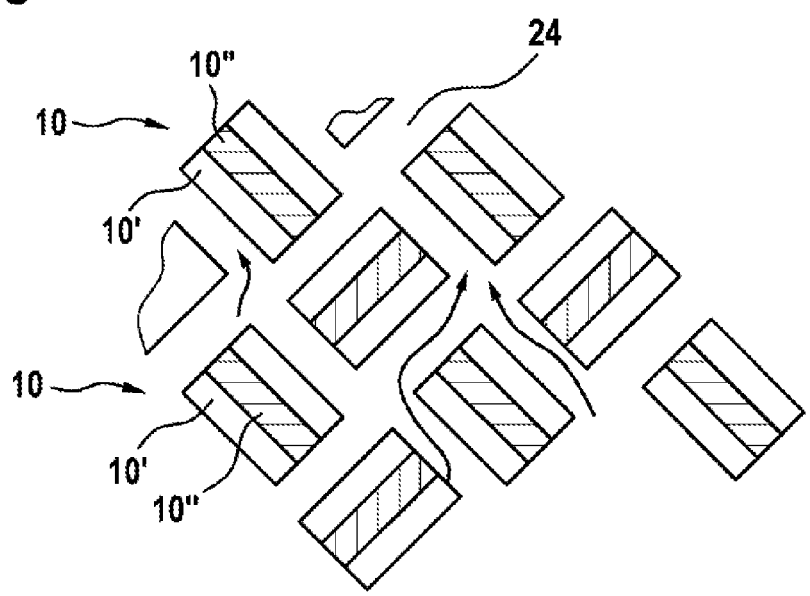

FIGS. 7a-d in a top view finally show schematic representations of partial areas of various gas distribution structures according to the invention. The gas distribution structures according to FIGS. 7a-d here comprise deformable structures 10 having a first deformation area 10" and a second deformation area 10', a first area 10" arranged on the lower surface 4b of the deformable structure 10, in particular, being of tapered formation. This makes it possible to enlarge the duct width 16 of the ducts 24, particularly in the area of the boundary surface of the gas distributor plate 2 with the membrane electrode assembly 6. FIGS. 7a and 7c here comprise rows of block-shaped deformable structures 10 arranged in an offset pattern and running parallel to one another. FIG. 7c shows the same arrangement as FIG. 7a, only with rounded, block-shaped deformable structures 10. In FIG. 7d the deformable structures 10 are likewise of block-shaped formation, but in contrast to the embodiments according to FIG. 7a-c in rows arranged alternating with one another in a transverse and longitudinal direction.

What is claimed is:

1. A gas distributor plate (2) for gas distribution and flow guidance at least in electrolysers or fuel cells, the gas distributor plate (2) comprising a contact surface and a gas distribution and flow guidance structure arranged on the contact surface,
   wherein, in cross section, the gas distributor plate (2) extends from a minimum height to a maximum height,
   wherein the contact surface is configured to contact a bipolar plate (8) at points at the maximum height,
   wherein the gas distribution and flow guidance structure is configured to contact a membrane electrode assembly (6) at points at the minimum height,
   wherein the gas distribution and flow guidance structure is formed as a deformable structure (10),
   wherein the deformable structure includes a deformed depression (14') positioned between adjacent points at the minimum height, and
   wherein the deformed depression (14') includes an apex extending to a height between the minimum height and the maximum height.

2. The gas distributor plate (2) as claimed in claim 1, characterized in that the gas distributor plate (2) has a material thickness of at least less than 150 µm.

3. The gas distributor plate (2) as claimed in claim 1, characterized in that the gas distributor plate (2) is formed, at least in part, from a metallic material.

4. The gas distributor plate (2) as claimed in claim 1, characterized in that the gas distributor plate (2) comprises an inhomogeneous deformable structure (10), in which edges of the deformable structures (10) have chamfers (26).

5. The gas distributor plate (2) as claimed in claim 1, characterized in that the deformable structure includes individual deformable structures that comprise slatted or finned flow baffle devices (20).

6. The gas distributor plate (2) as claimed in claim 1, characterized in that the deformable structure (10) of the gas distributor plate (2) includes individual deformable structures and is formed in such a way that gas distribution ducts (24) are formed along the deformable structure (10), wherein a width of the gas distribution ducts (24) and/or of the individual deformable structures (10) is less than 1 mm, and the individual deformable structures (10) and/or the gas distribution ducts (24) are arranged in rows arranged substantially parallel and/or perpendicular to one another.

7. The gas distributor plate (2) as claimed in claim 1, characterized in that the deformable structure includes individual deformable structures that are arranged offset in relation to one another and/or with the shape alternating in different directions and/or basically arranged randomly in relation to one another.

8. A fuel cell comprising a gas distributor plate (2) as claimed in claim 1, the bipolar plate (8), and the membrane electrode assembly (6), characterized in that the gas distributor plate (2) is arranged between the bipolar plate (8) and the membrane electrode assembly (6) and is conductively connected to the bipolar plate (8) and the membrane electrode assembly (6).

9. The gas distributor plate (2) as claimed in claim 1, characterized in that the gas distributor plate (2) has a material thickness of less than 100 µm.

10. The gas distributor plate (2) as claimed in claim 1, characterized in that the gas distributor plate (2) has a material thickness of less than 75 µm.

11. The gas distributor plate (2) as claimed in claim 1, wherein the gas distributor plate (2) possesses a homogeneous deformable structure (10) having a substantially constant deformation depth (14), wherein the deformable structure (10) has a maximum deformation depth of less than 1 mm.

12. The gas distributor plate (2) as claimed in claim 1, wherein the gas distributor plate (2) possesses a homogeneous deformable structure (10) having a substantially constant deformation depth (14), wherein the deformable structure (10) has a maximum deformation depth of less than 700 µm.

13. The gas distributor plate (2) as claimed in claim 1, wherein the gas distributor plate (2) possesses a homogeneous deformable structure (10) having a substantially constant deformation depth (14), wherein the deformable structure (10) has a maximum deformation depth of less than 350 µm.

14. The gas distributor plate (2) as claimed in claim 1, characterized in that the gas distributor plate (2) has a material thickness of less than 75 µm, wherein the gas distributor plate (2) possesses a homogeneous deformable structure (10) having a substantially constant deformation depth (14), wherein the deformable structure (10) has a maximum deformation depth of less than 350 µm.

15. The gas distributor plate (2) as claimed in claim 1, characterized in that the gas distributor plate (2) is formed, at least in part, from a ferrous material.

16. The gas distributor plate (2) as claimed in claim 1, characterized in that the gas distributor plate (2) is formed, at least in part, from a titanium material.

17. The gas distributor plate (2) as claimed in claim 1, characterized in that the gas distributor plate (2) comprises an inhomogeneous deformable structure (10), in which edges of the deformable structures (10) arranged towards an incident-flow side have chamfers (26).

18. The gas distributor plate (2) as claimed in claim 1, characterized in that the deformable structure (10) of the gas distributor plate (2) includes individual deformable structures and is formed in such a way that gas distribution ducts (24) are formed along the deformable structure (10), wherein a width of the gas distribution ducts (24) and/or of the individual deformable structures (10) is less than 500 µm, and the individual deformable structures (10) and/or the gas distribution ducts (24) are arranged in rows arranged substantially parallel and/or perpendicular to one another.

19. The gas distributor plate (2) as claimed in claim 1, characterized in that the deformed depression (14') extends back away from the membrane electrode assembly (6) a distance less than a distance to the bipolar plate (8).

20. The gas distributor plate (2) as claimed in claim 1, characterized in that the deformed depression (14') and the adjacent contact points of the gas distributor plate (2) to the membrane electrode assembly (6) form a substantially "W" shape in cross-section.

21. The gas distributor plate (2) as claimed in claim 1, wherein the deformable structure includes the deformed depression (14'), which is a first deformed depression (14'), and
wherein a second deformed depression (14") is also positioned between the adjacent contact points of the gas distributor plate (2) to the membrane electrode assembly (6), the second deformed depression (14") extending back away from and out of contact with the membrane electrode assembly (6).

22. The gas distributor plate (2) as claimed in claim 21, wherein the first and the second deformed depressions (14', 14") each form a peak that is spaced apart from the membrane electrode assembly (6), and wherein the peaks of the first and the second deformed depressions (14', 14") are spaced apart from the membrane electrode assembly (6) substantially the same distance.

23. The gas distributor plate (2) as claimed in claim 1, characterized in that the deformed depression defines an open area positioned between adjacent points at the maximum height, and wherein the apex extends into the open area such that two troughs are formed that correspond to the adjacent points at the minimum height.

24. The gas distributor plate (2) as claimed in claim 23, characterized in that, in the cross section of the gas distributor plate (2), the apex and the two troughs form a wave shape.

25. A method for producing the gas distributor plate (2) as claimed in claim 1, characterized in that the gas distribution and flow guidance structure is produced by a forming method.

26. The fuel cell as claimed in claim 8 wherein the gas distributor plate (2) is connected to the bipolar plate (8) by a material bond.

* * * * *